United States Patent
Davis et al.

(10) Patent No.: US 6,512,991 B1
(45) Date of Patent: Jan. 28, 2003

(54) METHOD AND APPARATUS FOR REDUCING DEPOSITION VARIATION BY MODELING POST-CLEAN CHAMBER PERFORMANCE

(75) Inventors: Bradley M. Davis, Austin, TX (US); Allen L. Evans, Austin, TX (US); Craig W. Christian, Buda, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 414 days.

(21) Appl. No.: 09/614,312

(22) Filed: Jul. 12, 2000

(51) Int. Cl.$^7$ ................................................. G01K 1/20
(52) U.S. Cl. ................... 702/136; 702/130; 702/88; 702/99; 702/106
(58) Field of Search ..................... 702/136, 130, 702/88, 99; 700/121, 95; 438/14; 136/345.33; 125/13.01; 204/212; 29/438, 457; 76/101; 219/69; 73/766

(56) References Cited

U.S. PATENT DOCUMENTS 6,230,069 B1 * 5/2001 Campbell et al. ........... 700/121
6,277,235 B1 * 8/2001 Wing et al. ............. 156/345.33
6,417,014 B1 * 7/2002 Lam et al. ..................... 438/14

* cited by examiner

Primary Examiner—Brian Bui
Assistant Examiner—Tung S Lau
(74) Attorney, Agent, or Firm—Williams, Morgan & Amerson, P.C.

(57) ABSTRACT

A method for reducing deposition thickness variation in a processing tool comprises storing a post-clean performance model of the processing tool; receiving at least one of a showerhead age and a tool idle time associated with the processing tool as an input parameter; determining temperature control parameters based on the input parameter and the post-clean performance model; and modifying an operating recipe of the processing tool based on the temperature control parameters. A processing system includes a processing tool and an automatic process controller. The processing tool is adapted to process wafers in accordance with an operating recipe. The automatic process controller is adapted to store a post-clean performance model of the processing tool, receive at least one of a showerhead age and a tool idle time associated with the processing tool as an input parameter, determine temperature control parameters based on the input parameter and the post-clean performance model, and modify the operating recipe of the processing tool based on the temperature control parameters.

15 Claims, 3 Drawing Sheets

METHOD AND APPARATUS FOR REDUCING DEPOSITION VARIATION BY MODELING POST-CLEAN CHAMBER PERFORMANCE

BACKGROUND OF THE INVENTION

1. Field of the Invention

This invention relates generally to semiconductor device manufacturing, and, more particularly, to a method and apparatus for reducing deposition variation by modeling post-clean chamber performance.

2. Description of the Related Art

In the manufacture of semiconductor devices, wafers, such as silicon wafers, are subjected to a number of processing steps. The processing steps include depositing or forming layers, patterning the layers, and removing portions of the layers to define features on the wafer. One such used to form the layers is known as chemical vapor deposition (CVD), wherein reactive gases are introduced into a vessel, e.g. a CVD tool, containing the semiconductor wafers. The reactive gases facilitate a chemical reaction that causes a layer to form on the wafers.

As the CVD tool is used repeatedly, material builds up on the internal surfaces of the tool, eventually affecting the deposition rate and the defect density. One such application involves the formation of silicon dioxide using tetraethoxysilane (TEOS) in a plasma enhanced CVD (PECVD) tool. Silicon dioxide material builds up over time on the showerheads and other surfaces of the tool. Preventative maintenance procedures are performed periodically to remove this buildup and stabilize the deposition rate. Typically, a wet clean process (i.e., disassembly of the tool) is performed every 7–14 days, and in-situ cleanings (e.g., exposing the chamber to reactive plasmas, such as $C_3F_8$) are performed every two to three lots (e.g., each lot includes 25 wafers). After each cleaning evolution, the deposition rate for the tool is affected. During processing of the first 10 to 25 wafer after the tool is cleaned, the deposition rate of the tool is reduced. The degree and duration of this effect depends on a number of factors including the age of the showerheads, and the type of cleaning performed. FIG. 1A is a graph depicting deposition rates following a cleaning operation. The curve 4 reflects the deposition rate for a tool with new shower heads, and the curve 6 reflects the deposition rate for a tool with aging showerheads (i.e., typically replaced on 6–12 month intervals). For a newer shower head, the deposition rate is increased for the first wafers after the cleaning. As the shower heads age, the effect reverses, and the deposition rate for the first wafers after the cleaning is decreased. Also, the effect of the cleaning on the deposition rate has a longer duration on the tool with older showerheads.

A technique for addressing the post cleaning deposition rate fluctuation involves varying the temperature during the first wafers processed. This is achieved by setting parameters in the operating recipe of the tool. These parameters include a control temperature, a maximum ramp parameter, and a ramp rate. The first wafer is processed at the temperature defined by the control temperature minus the maximum ramp parameter. Decreasing the temperature during the formation of the layer increases the deposition rate. The temperature is incremented by the ramp rate (i.e., defined in degrees per wafer) until the control temperature is reached. For example, the control temperature may be 400° C., the ramp may be 5° C., and the ramp rate may be 0.5° C./wafer. This would result in a ramp from 395° C. to 400° C. over the first ten wafers following the cleaning operation. Different maximum ramp and ramp rate parameters may change the number of wafers in the set during the ramp period. These parameters are static in the operating recipe. Compromise values are selected during programming of the recipe. As the showerheads age, the effectiveness of this approach decreases, because the duration of the post-clean deposition rate effect increases.

Another destabilizing factor affecting the deposition rate results from subjecting the tool to an idle period. The tool commonly experiences idle times where the temperature of the tool is maintained at a level significantly less than its operating temperature. Other reasons for idle time include periodic testing or calibration and delays caused by other tools (not shown) upstream in the processing line. When the tool is placed back in service following the idle time, the deposition rate is generally lower during the first wafers processed. This effect is illustrated by the curve 8 shown in FIG. 1B.

The idle time destabilizing factor causes a deposition rate effect opposite that of the post-clean effect. In a situation where a clean is performed on a tool with new shower heads, but the tool is left idle for a period of time before being placed in service, these effects can effectively cancel. However, in a tool with older showerheads, the effect may be compounded.

The static post-clean temperature ramp technique described above has limitations due to the variability in the duration of the post-clean destabilizing factor and the possibility of the post-idle destabilizing factor. The temperature ramp may control thickness variations during one set of operating conditions, but as the showerheads age and idle times are interjected, its effectiveness decreases. If the thickness of the deposited wafer is not within tolerances, the wafer is re-worked (e.g., polished if too thick or subjected to another deposition if too thin). This rework is costly because it ties up the tools necessary for the rework to process only a limited number of wafers.

The present invention is directed to overcoming, or at least reducing the effects of, one or more of the problems set forth above.

SUMMARY OF THE INVENTION

One aspect of the present invention is seen in a method for reducing deposition thickness variation in a processing tool. The method comprises storing a post-clean performance model of the processing tool; receiving at least one of a showerhead age and a tool idle time associated with the processing tool as an input parameter; determining temperature control parameters based on the input parameter and the post-clean performance model; and modifying an operating recipe of the processing tool based on the temperature control parameters.

Another aspect of the present invention is seen in a processing system including a processing tool and an automatic process controller. The processing tool is adapted to process wafers in accordance with an operating recipe. The automatic process controller is adapted to store a post-clean performance model of the processing tool, receive at least one of a showerhead age and a tool idle time associated with the processing tool as an input parameter, determine temperature control parameters based on the input parameter and the post-clean performance model, and modify the operating recipe of the processing tool based on the temperature control parameters.

BRIEF DESCRIPTION OF THE DRAWINGS

The invention may be understood by reference to the following description taken in conjunction with the accompanying drawings, in which like reference numerals identify like elements, and in which.

Figure 1A:
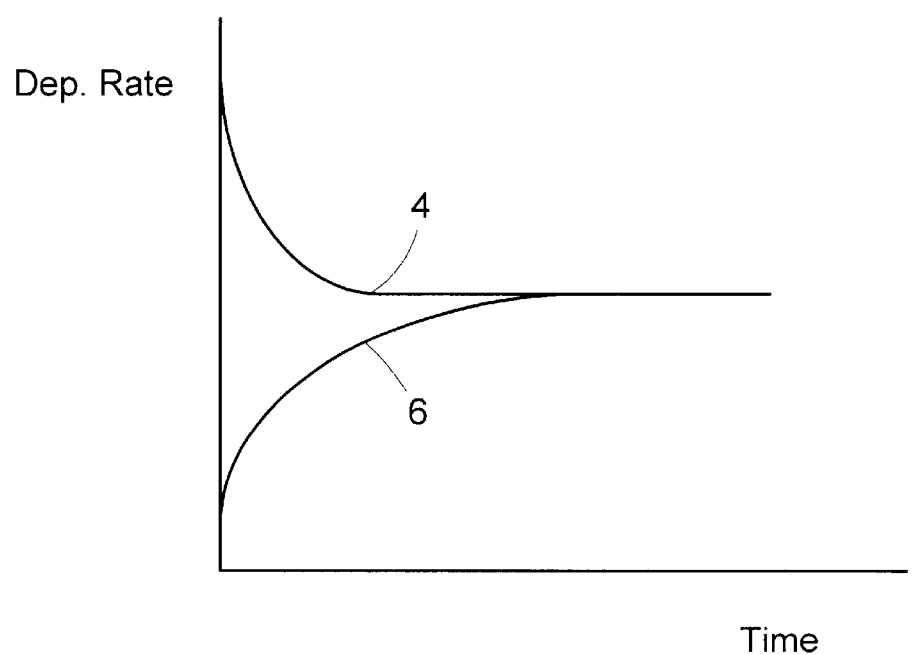
FIGS. 1A and 1B are prior art graphs depicting deposition rate instability periods following cleaning operations and idle times, respectively.
Figure 1B:
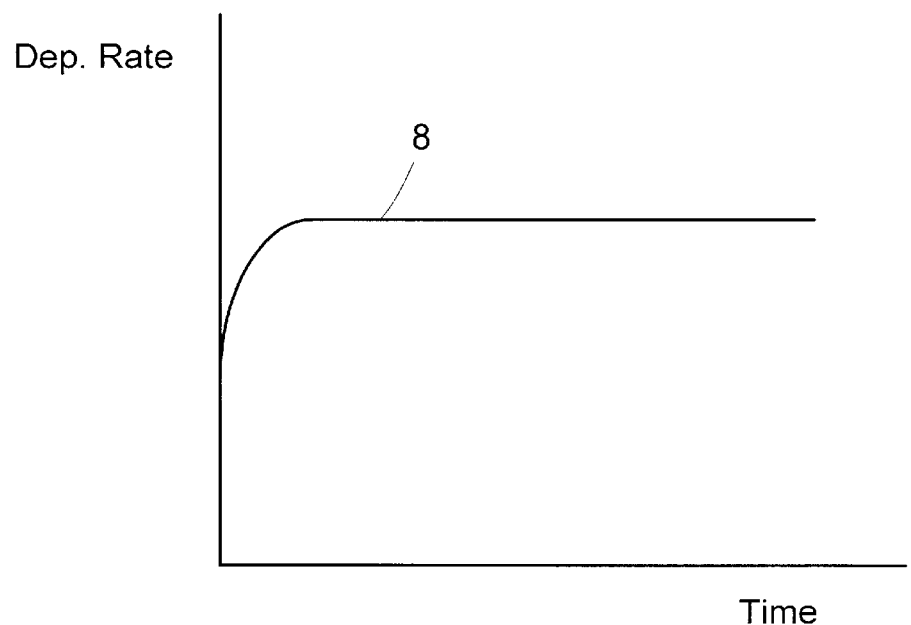

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
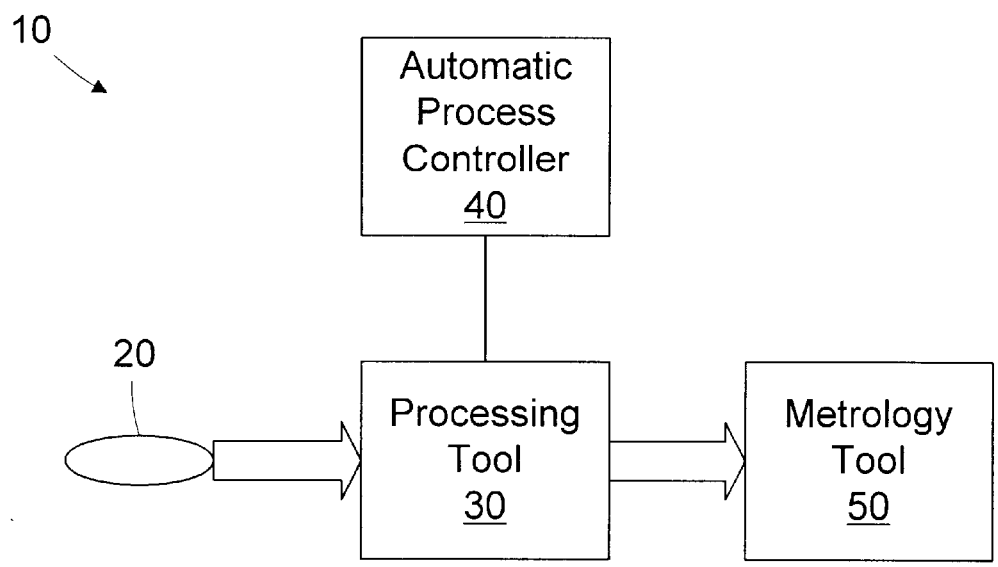
FIG. 2 is a simplified block diagram of a processing system in accordance with one illustrative embodiment of the present invention.

Referring now to FIG. 2, a simplified diagram of an illustrative processing line 10 for processing wafers 20 in accordance with the present invention is provided. The processing line includes a processing tool 30, an automatic process controller 40, and a metrology tool 50. The automatic process controller 40 interfaces with the processing tool 30 for modifying operating parameters of the processing tool 30 based on a model of the performance of the processing tool 30 following a cleaning procedure and/or an idle time. The metrology tool 50 may be used to provide feedback to the automatic process controller 40 for updating the model. In the illustrated embodiment, the processing tool 30 is a plasma enhanced chemical vapor deposition (PECVD) tool useful for depositing layers, such as silicon dioxide using tetraethoxysilane (TEOS), on the semiconductor wafer 20. A suitable PECVD tool is a Concept 2 Dual Sequel Express tool sold by Novellus Systems. Although the invention is described as it may be implemented in a PECVD tool, the concepts described herein may be applied to various other processing tools used for forming a variety of process layers, such as low pressure CVD tools, sub-atmospheric CVD tools, etc.

The automatic process controller 40 contains a model of the performance of the processing tool 30 based on inputs such as the age of a showerhead (not shown) and the idle time experienced by the processing tool 30. The model may be generated and/or updated based on input from the metrology tool 50 of the actual thickness of the deposited layer. An exemplary metrology tool 50 suitable for measuring the thickness of the layer is a Opti-Probe 3620 offered by Therma-Wave, Inc.

In the illustrated embodiment, the automatic process controller 40 is a computer programmed with software to implement the functions described. However, as will be appreciated by those of ordinary skill in the art, a hardware controller designed to implement the particular functions may also be used. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary software system capable of being adapted to perform the functions of the automatic process controller 40 described is the ObjectSpace Catalyst system offered by ObjectSpace, Inc. The ObjectSpace Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

The automatic process controller 40 receives a showerhead age input and/or an idle time input, either manually from an operator or automatically from monitoring the processing tool 30. Based on the input parameters, the automatic process controller 40 consults a model of the performance of the processing tool 30 to determine recipe parameters for the control temperature, maximum ramp parameter, and ramp rate to account for predicted deposition rate deviations.

Qualitatively, where the processing tool 30 has a newer showerhead, the ramp rate may be higher, while with an older showerhead, the ramp rate might be lower. In a case where the processing tool 30 is exiting from a significant idle time, only a small ramp, or even no ramp, may be required for a new showerhead. An older showerhead may require less of a ramp as compared to a situation without the idle time.

The post-clean performance model may be generated by the automatic process controller 40, or alternatively, the model may be generated by a different processing resource (not shown) and stored on the automatic process controller 40 after being developed. The model may be developed using the process tool 30 or on a different tool (not shown) having similar operating characteristics. For purposes of illustration, it is assumed that the post-clean performance model is generated and updated by the automatic process controller 40 based on actual performance of the processing tool 30 as measured by the metrology tool 50. The post-clean performance model is trained based on historical data collected from numerous processing runs of the processing tool 30 over the cleaning life cycle (i.e., the time between cleanings) and the showerhead life cycle. Changes in the characteristics of the processing tool 30 and how they affect its operation are derived from the historical data to generate the model. Various modeling techniques, well known to those of ordinary skill in the art, are suitable. Exemplary modeling techniques include neural network modeling, principal component analysis (PCA), and projection to latent structures (PLS).

The following example is provided as a high-level illustration of how a model of the processing tool 30 may be generated. The specific implementation of the model may vary depending on the modeling technique selected, and such specific implementation is well known to those of ordinary skill in the art. Thus, for clarity and ease of illustration, such specific details are not described in greater detail herein.

Figure 3:
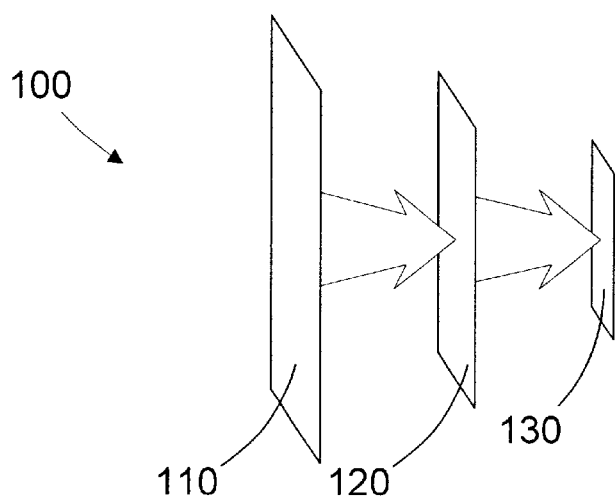
FIG. 3 is a simplified diagram of a neural network modeling system in accordance with one embodiment of the present invention.

Turning briefly to FIG. 3, a simplified diagram of a neural network 100 is provided. The neural network 100 includes an input layer 110, a hidden layer 120, and an output layer 130. The input layer 110 receives those input values deemed appropriate for modeling the performance of the processing tool 30. In the illustrated embodiment, variables such as the showerhead age and idle time are received as inputs, although other inputs may also be used. The hidden layer 120 "learns" the interactions between the various inputs through a training procedure by which the neural network 100 is exposed to historical performance data of the processing tool 30 or a similar processing tool (not shown). The hidden layer 120 weights each of the inputs and/or combinations of the inputs to predict some future performance. Through analysis of historical data, the weighting values are changed to try to increase the success at which the model predicts the future performance. The output layer 130 distills the manipulation of the hidden layer 120 to generate a prediction of, for example, the temperature control parameters for reducing deposition thickness variations in the processing tool 30.

Once the model is sufficiently trained, it may be used in a production environment to predict the operation of processing tool 30 based on current input value measurements. Based on the results predicted by the neural network 100, the temperature control parameters are predicted and the operating recipe of the processing tool is modified accordingly. In the production environment, periodic measurement from the metrology tool 50 are provided as feedback to the automatic controller 40 for updating the post-clean performance model.

Figure 4:
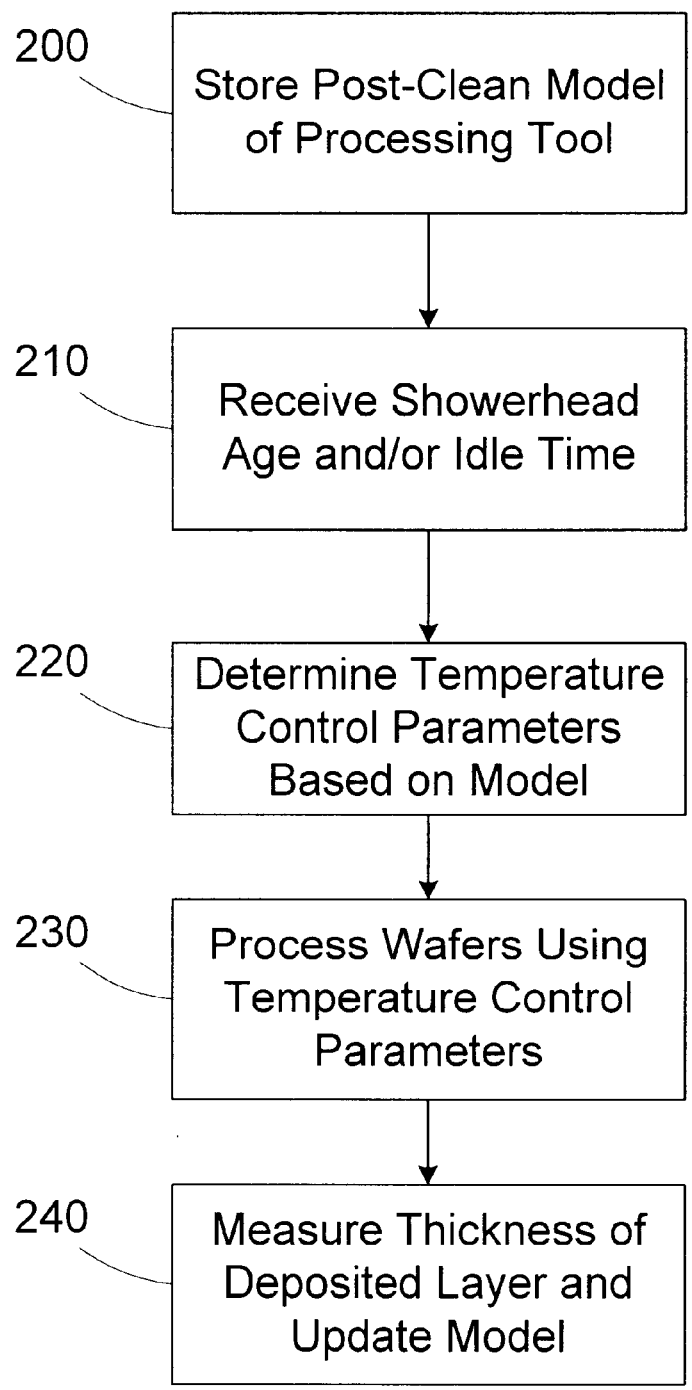
FIG. 4 is a flow diagram of a method for reducing deposition variation in accordance with one aspect of the present invention.

Referring now to FIG. 4, a flow diagram of a method for reducing deposition thickness variation in accordance with one illustrative embodiment of the present invention is provided. In block 200, a post-clean model of the processing tool 30 performance is stored. During the generation of the model, various parameters, including the temperature control variables and the resulting layer thickness measurements recorded by the metrology tool 50, are used to develop a predictive model of future temperature control variables required to achieve a target thickness. In block 210, at least one of a showerhead age and a tool idle time are received (i.e., based on either manual or automatic input). Temperature control parameters are determined for a set of post-clean wafers based on the inputs and the post-clean performance model in block 220. The wafers 20 are processed in the processing tool 30 based on the temperature control parameters in block 230. In block 240, the actual thickness of the deposited layer is measured on a periodic basis (e.g., a sample of the first lot of wafers processed post-clean) by the metrology tool 50 to provide feedback for the post-cleaning performance model.

Information from the automatic process controller 40 may also be used to diagnose problems with the processing tool 30. As described above, as the processing tool 30 is used to process wafers, material gradually builds up on the internal surfaces resulting in a change in the deposition rate. A problem with the processing tool 30 may be identified if the deposition thicknesses measured by the metrology tool 50 do not correspond to expected thicknesses. Also, if the predicted temperature control parameters reach a predetermined condition indicating a degraded condition of the showerhead, a maintenance procedure to replace the showerhead may be scheduled. In this manner, the replacement interval of the showerheads may be determined based on actual performance rather than on a static schedule. This may extend the useful life of the showerhead and decrease the downtime experienced by the processing tool 30. Alternatively, a premature degraded condition may be identified suggesting the necessity of an early replacement.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for reducing deposition thickness variation in a processing tool, comprising:

storing a post-clean performance model of the processing tool;

receiving at least one of a showerhead age and a tool idle time associated with the processing tool as an input parameter;

determining temperature control parameters based on the input parameter and the post-clean performance model; and modifying an operating recipe of the processing tool based on the temperature control parameters.

2. The method of claim 1, further comprising processing wafers in the processing tool based on the temperature control parameters.

3. The method of claim 2, further comprising:

measuring a thickness of a layer formed on a sample of the wafers; and updating the post-clean model based on the thickness measurements.

4. The method of claim 1, wherein generating the post-clean performance model of the processing tool comprises generating a neural network model of the performance of the processing tool.

5. The method of claim 1, wherein determining the temperature control parameters comprises determining at least one of a control temperature, a maximum ramp parameter, and a ramp rate.

6. A processing system, comprising:
a processing tool adapted to process wafers in accordance with an operating recipe; and
a processing device programmed with instructions that, when executed, perform a method for reducing deposition thickness variation in the processing tool, the method including:
storing a post-clean performance model of the processing tool;
receiving at least one of a showerhead age and a tool idle time associated with the processing tool as an input parameter;
determining temperature control parameters based on the input parameter and the post-clean performance model; and
modifying the operating recipe of the processing tool based on the temperature control parameters.

7. The processing system of claim 6, wherein the method further comprises operating the processing tool in a production mode based on the temperature control parameters.

8. The processing system of claim 7, further comprising a metrology tool adapted to measure a thickness of a layer formed on a sample of the wafers, wherein the method further comprises updating the post-clean model based on the thickness measurements.

9. The processing system of claim 6, wherein generating the post-clean performance model of the processing tool in the method comprises generating a neural network model of the performance of the processing tool.

10. The processing system of claim 6, the temperature control parameters include at least one of a control temperature, a maximum ramp parameter, and a ramp rate.

11. A processing system, comprising:
a processing tool adapted to process wafers in accordance with an operating recipe; and
an automatic process controller adapted to store a post-clean performance model of the processing tool, receive at least one of a showerhead age and a tool idle time associated with the processing tool as an input parameter, determine temperature control parameters based on the input parameter and the post-clean performance model, and modify the operating recipe of the processing tool based on the temperature control parameters.

12. The processing system of claim 11, further comprising a metrology tool adapted to measure a thickness of a layer formed on a sample of the wafers, wherein the automatic process controller is adapted to update the post-clean model based on the thickness measurements.

13. The processing system of claim 11, wherein the post-clean performance model comprises a neural network model of the performance of the processing tool.

14. The processing system of claim 11, wherein the temperature control parameters include at least one of a control temperature, a maximum ramp parameter, and a ramp rate.

15. A processing system, comprising:
a processing tool adapted to process wafers in accordance with an operating recipe; and
means for storing a post-clean performance model of the processing tool;
means for receiving at least one of a showerhead age and a tool idle time associated with the processing tool as an input parameter;
means for determining temperature control parameters based on the input parameter and the post-clean performance model; and
means for modifying the operating recipe of the processing tool based on the temperature control parameters.

* * * * *